W. M. RUSSELL.
WIRE REEL GUARD.
APPLICATION FILED JUNE 9, 1913.
1,092,293.
Patented Apr. 7, 1914.
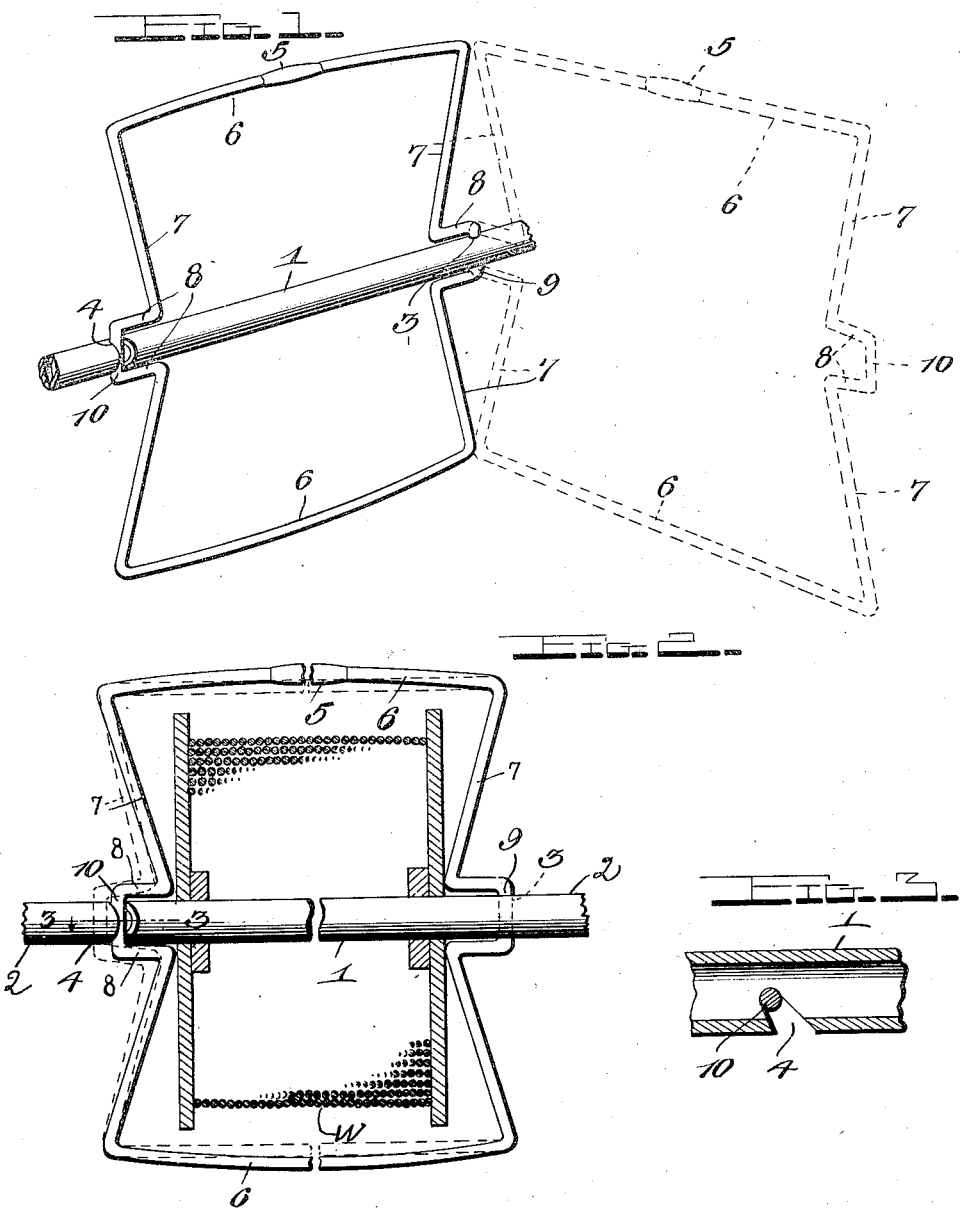
Inventor
W. M. Russell,
Witnesses
Chas. L. Griesbauer.
J. Ralph Hoge
By H. B. Willson & Co.
Attorneys

UNITED STATES PATENT OFFICE.

WILLIAM M. RUSSELL, OF SAPULPA, OKLAHOMA.

WIRE-REEL GUARD.

1,092,293.

Specification of Letters Patent.  Patented Apr. 7, 1914.

Application filed June 9, 1913.  Serial No. 772,592.

*To all whom it may concern:*

Be it known that I, WILLIAM M. RUSSELL, a citizen of the United States, residing at Sapulpa, in the county of Creek and State of Oklahoma, have invented certain new and useful Improvements in Wire-Reel Guards; and I do declare the following to be a full, clear, and exact description of the invention, such as will enable others skilled in the art to which it appertains to make and use the same.

This invention relates to winding and reeling, and more especially to those reels on which a spool of fence wire is adapted to be mounted, and from which the wire can be taken at will as it is put up along a line of fencing.

The object of the invention is to provide a guard to prevent barbed wire from cutting the hand while it is in use, and to this end the invention consists in a peculiar form of frame hingedly mounted at one end on the shaft on which the spool is journaled, and detachably connected at its other end with said shaft—all as hereinafter more fully described and claimed and as shown in the drawings wherein—

Figure 1 is a perspective view of this guard ready for use, showing the frame in full lines as locked to its shaft and in dotted lines as turned aside; Fig. 2 is an elevation of the guard, showing the wire coil and spool in section within the same; and Fig. 3 is an enlarged sectional detail of the latch.

In the drawings the numeral 1 designates a shaft which is of three-quarter inch pipe about three and one-half feet long, and when in use the extremities 2 of this shaft rest in a suitable supporting frame which may stand on the ground or in a wagon, whereas at other times the extremities 2 are grasped by two men so that the wire reel can be carried from point to point. In this shaft is formed a hole 3, and about sixteen inches from the same a notch 4 best seen in Fig. 3. These are the dimensions for an ordinary spool of wire, although if the guard be employed for a roll of rather wide fencing fabric its proportion will, of course, be larger.

Associated with the shaft is a frame composed of spring wire of about one-quarter inch diameter, bent into substantially rectangular outline and with the ends of the piece of wire united with each other as at 5. The frame as thus outlined comprises two parallel arms 6, each end of each of which is turned inward in an acute angle as at 7, thence bent outward at an acute angle at 8 parallel with the shaft 1, and the two outturned extremities 8 are integrally united at one end of the frame as at 9 in a short stretch which passes through the hole 3, while the short stretch 10 at the other end of the frame is adapted to rest in the notch 4. Thus it will be seen that the end members 7 are united by what might be called a crank, one crank being pivotally mounted within the shaft and the other latched thereto. The full lines in Fig. 2 show it in latched position, and the dotted lines show how this end of the frame swings outward when it is unlatched.

With this construction of parts, the device as a whole lies ordinarily on a saw horse or other support for the ends of the shaft 1. When now the reel or spool W of wire is to be put in place, the stretch 10 is disengaged from the notch and the entire frame swung aside as seen in dotted lines in Fig. 1; then the spool is passed over the left end of the shaft 1 into the position indicated in Fig. 2, and finally the frame is restored to this position, its left end sprung slightly inward, and its stretch 10 reëngaged with the notch 4 so that the parts stand as seen in this view and the reel and its spool are free to revolve on the shaft 1 within the frame while the latter protects the operator from injury. The wire or the wire fabric is drawn from the spool and put up on the fence posts in the ordinary manner, and from time to time the support carrying the spool is advanced either by hand or by driving the wagon along the line of fencing.

I do not wish to be limited to the proportions of parts, and it will be observed that there are only two of them, one being a piece of ordinary tubing provided with a hole and a notch, and the other a piece of spring wire bent into the shape described and with its ends soldered or otherwise connected.

What is claimed as new is:

1. A guard of the character described comprising a shaft provided with a hole and a notch spaced from each other, and a spring wire frame of substantially rectangular construction having parallel side arms and with its end bars bent inward at acute angles to said side arms, thence outward on parallel lines and integrally united, thereby forming two cranks whereof one is journaled in said hole and the other removably engaged with said notch, for the purpose set forth.

2. A guard of the character described comprising a tubular shaft provided with a transverse hole and at a distance from it with a transverse notch opening through one side of the shaft, and a frame of spring wire whose ends are united with each other, one side of the frame being pivotally mounted in said hole and the other side being adapted to engage said notch when the sides of the frame are sprung toward each other, the whole for use substantially as described.

In testimony whereof, I have hereunto set my hand in presence of two subscribing witnesses.

WILLIAM M. RUSSELL.

Witnesses:
CHRISTINE GAHAGAN,
W. L. McEUEN.